(12) United States Patent
Kubota et al.

(10) Patent No.: US 7,400,454 B2
(45) Date of Patent: *Jul. 15, 2008

(54) DIGITAL CAMERA IMAGING LENS

(75) Inventors: Yoji Kubota, Nagano (JP); Toshio Matsui, Nagano (JP)

(73) Assignee: Nagano Optics Laboratory Corporation, Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/788,307

(22) Filed: Apr. 19, 2007

(65) Prior Publication Data

US 2007/0195426 A1    Aug. 23, 2007

(51) Int. Cl.
*G02B 15/14* (2006.01)
(52) U.S. Cl. .................................. 359/689; 359/791
(58) Field of Classification Search ......... 359/686–690, 359/756, 757, 759, 760, 763–765, 767–769, 359/771–772, 775, 784, 791
See application file for complete search history.

(56) References Cited

U.S. PATENT DOCUMENTS

| 4,109,995 | A | 8/1978 | Betensky |
| 5,940,219 | A | 8/1999 | Yamada |
| 6,028,711 | A | 2/2000 | Adachi |
| 6,441,971 | B2 | 8/2002 | Ning |
| 2004/0021957 | A1* | 2/2004 | Isono ............... 359/791 |

FOREIGN PATENT DOCUMENTS

| JP | 62 109014 | 5/1987 |
| JP | 04 211214 | 8/1992 |
| JP | 10 301022 | 11/1998 |
| JP | 11 052227 | 2/1999 |
| JP | 11 052231 | 2/1999 |
| JP | 2002 228922 | 8/2002 |

OTHER PUBLICATIONS

International Search Report dated Feb. 10, 2005 (4 pages).

* cited by examiner

*Primary Examiner*—Hung X. Dang
*Assistant Examiner*—Joseph Martinez
(74) *Attorney, Agent, or Firm*—Flynn, Theil, Boutell & Tanis, P.C.

(57) ABSTRACT

A digital camera imaging lens includes first, second and third lenses arranged in sequence from an object side toward an imaging surface side. The first lens is a meniscus lens having a positive power, whose convex surface faces the object side. The second lens is a meniscus lens having a negative power, whose concave surface faces the object side. The third lens is an aspherical lens having an inflection point on its object-side surface. An aperture stop is disposed between the first and second lenses. The imaging surface is defined by an element surface of a photosensor.

8 Claims, 14 Drawing Sheets

FIG.11
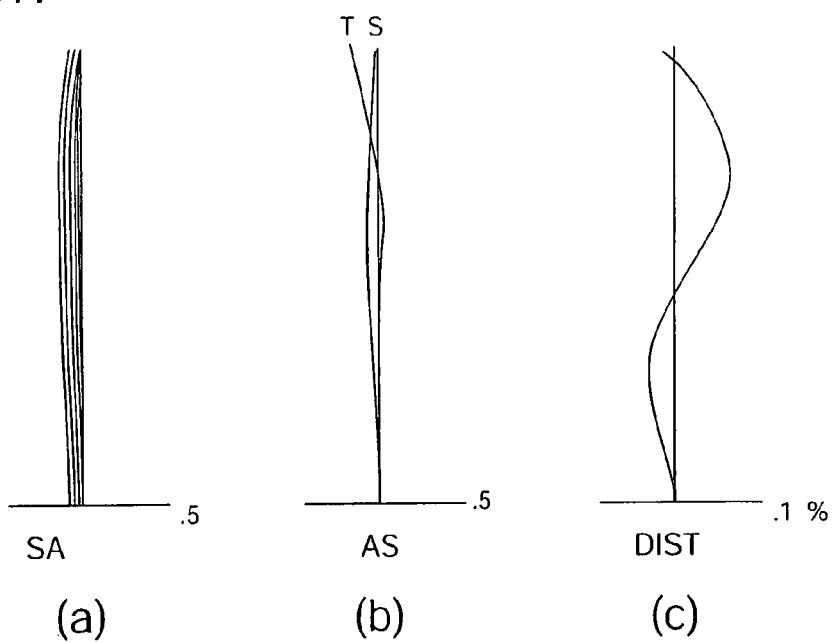
(a) SA .5
(b) AS .5
(c) DIST .1 %
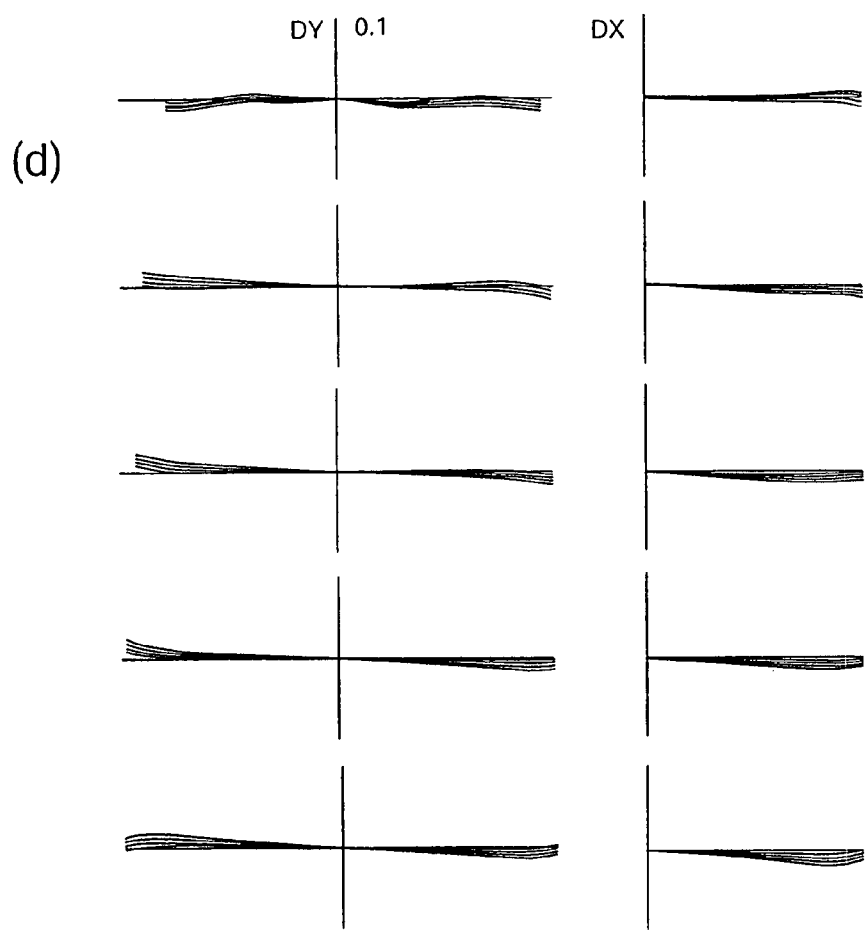

FIG.13
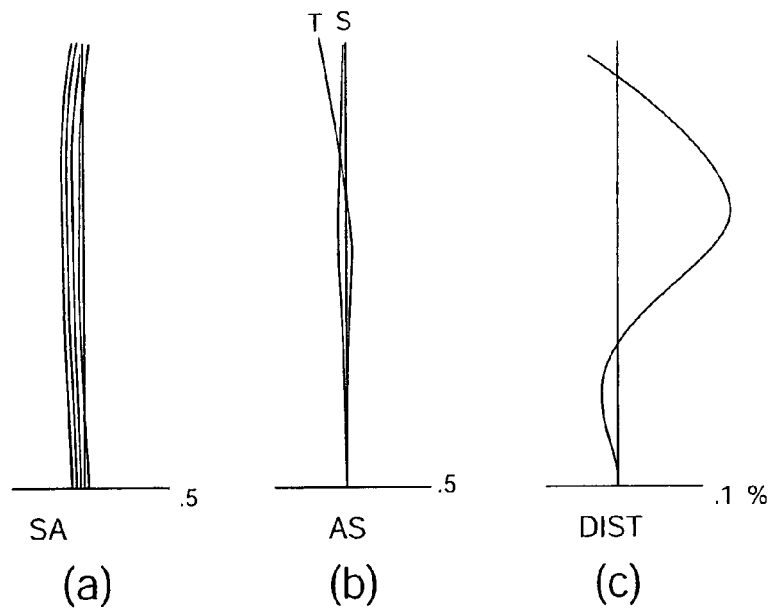
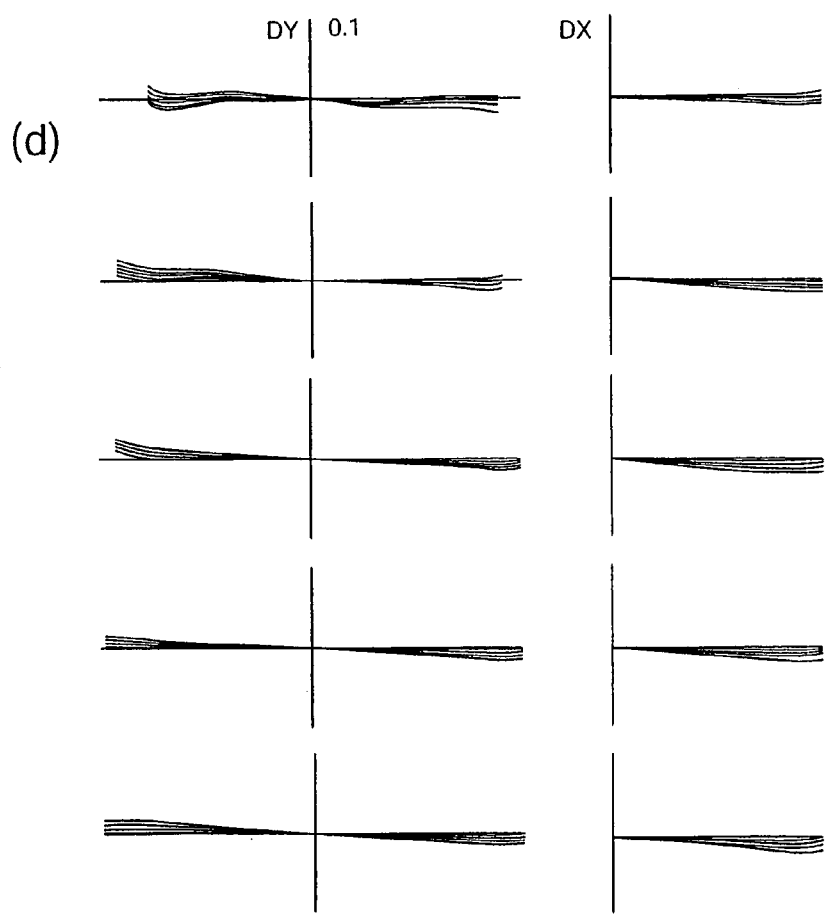

FIG.14
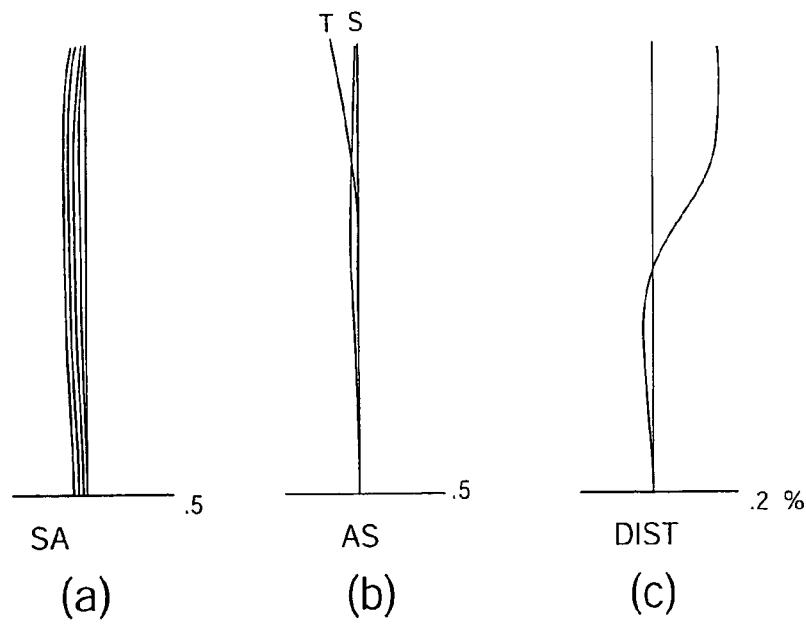
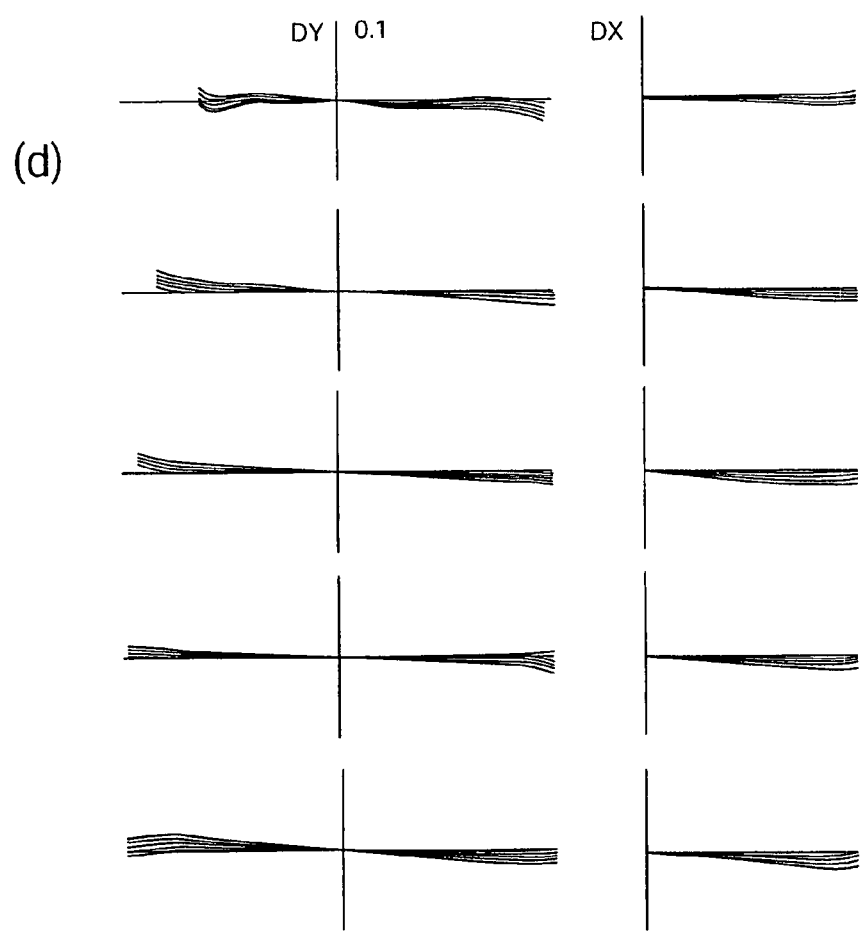

DIGITAL CAMERA IMAGING LENS

CROSS-REFERENCE TO RELATED APPLICATIONS

This application claims the benefit of U.S. Ser. No. 10/532,382, filed Apr. 21, 2005, which is now U.S. Pat. No. 7,251,083, which is incorporated herein in its entirety.

TECHNICAL FIELD

The present invention relates to a small, lightweight imaging lens used in an automobile-mounted camera, a surveillance camera, a digital camera, a camera installed in a mobile telephone, or the like that uses a CCD, CMOS, or other photosensor.

BACKGROUND ART

It is desired that an imaging lens installed in surveillance cameras, digital cameras, and other devices that use CCD, CMOS, or other photosensors be provided with the ability to faithfully reproduce the subject. CCDs themselves or CCD cameras have also been made smaller in recent years, which has been accompanied by an inevitable increase in the demand for miniaturization and compact design of the imaging lenses incorporated therein. CCD and other photosensors have also been provided with high resolution on the order of millions of pixels in contrast with CCD miniaturization. It has inevitably become necessary for the imaging lenses used in cameras having such sensors to also be capable of demonstrating high optical performance. In the past, in order to demonstrate high optical performance, aberration had been corrected using large numbers of lens elements.

A characteristic of a CCD, CMOS, or other photosensor is that the ray angle of each pixel incorporated therein is limited. In a camera equipped with an optical system that ignores this characteristic, the peripheral light intensity is reduced, and shading occurs. In order to compensate for these effects, methods have been employed whereby an electrical correction circuit is provided, or a microlens array that forms a pair with the photosensor is mounted or the like, and the angle at which light is received on the surface of the element is enlarged or the like. Alternatively, configurations have been adopted whereby the exit pupil is positioned as far away as possible from the image surface.

On the other hand, there must be a space between the imaging lens and the CCD in which a low-pass filter, infrared-blocking filter, or the like is inserted. A limitation therefore exists in that the back focus of the imaging lens must be lengthened to a certain degree.

An imaging lens having high resolution, a small number of lens elements, and a compact structure is disclosed in JP-A 2002-228922. The imaging lens disclosed therein is composed of four elements in three groups, and the second and third lens groups therein are composed of single lenses. An aspherical surface that contains an inflection point is also employed as the lens surface.

DISCLOSURE OF THE INVENTION

An object of the present invention is to provide a lightweight, compact imaging lens whereby the maximum exit angle with respect to the element surface of the photosensor can be made smaller than the angle of view in order to prevent shading, and aberration can be corrected in order to adapt to high resolutions of millions of pixels.

Another object of the present invention is to provide a lightweight, compact imaging lens in which an aspherical surface not containing an inflection point is employed in the lens surface, in which aberration can be corrected in order to adapt to high resolutions of millions of pixels, which is advantageous to produce, and which has a small number of constituent lens elements.

In order to achieve the abovementioned objects, the imaging lens according to a first invention of the present application comprises three elements in three groups, wherein a first lens with a positive meniscus whose convex surface faces an object side, a subsequently positioned second lens whose meniscus has a negative power, and a third lens with positive or negative power are arranged sequentially from the object side, and the second and third lenses function as correction lenses. The first lens also has a stronger power compared with the second and third lenses. Furthermore, among the first, second, and third lenses, both surfaces of at least the second lens and third lens are aspherical. Also, at least one aspherical inflection point is formed at the aspherical surface of the third lens.

In this arrangement, at least one of the lens surfaces among the lens surfaces on both sides of the aforementioned first lens can be an aspherical surface.

It is preferred in the imaging lens of the present invention that when a total focal distance of the imaging lens is f, a focal distance of the first lens is f1, a distance from an incident surface on the object side to an imaging surface of the first lens is Σd, and an Abbe number of the second lens is νd2, the following conditional expressions are satisfied.

$$0.50 < f1/f < 1.5 \quad (1)$$

$$0.50 < \Sigma d/f < 1.5 \quad (2)$$

$$50 > \nu d2 \quad (3)$$

Conditional expression (1) is a condition for ensuring that spherical aberration is kept stable and that the lens system as a whole is compact. If the lower limit is exceeded, the lens system can be made compact, but it becomes difficult to correct spherical aberration. If the upper limit is exceeded, spherical aberration becomes easy to correct, but it becomes impossible to keep the lens system as a whole compact. By satisfying this conditional expression, the lens system can be made compact while a satisfactory state of spherical aberration is maintained.

In the present invention, a total length of the imaging lens can be reduced by making the first lens into a lens with a positive meniscus whose convex surface faces the object side, and satisfying conditional expression (1).

Conditional expression (2) is also a condition for ensuring that the lens system as a whole is more compact. Particularly in the case of an imaging lens employed in a camera installed in a mobile telephone, it is necessary to reduce the size of the lens system as a whole while at the same time reducing the total length of the lens system. The optical system is preferably designed so as to satisfy conditional expression (2) in order to satisfy these requirements. Below the lower limit of conditional expression (2), the lens system can be made compact, but various types of aberration become difficult to correct. Exceeding the upper limit is also not preferred, because the lens system increases in size.

Conditional expression (3) is a condition for making the Abbe number of the second lens equal to 50 or less, and ensuring that the on-axis chromatic aberration and the off-axis chromatic aberration are kept stable.

It is also preferred that the third lens in the imaging lens of the present invention be configured so that a peripheral portion of a lens surface thereof on the image side is convex towards the image surface, and that a lens surface thereof on an object side and a lens surface thereof on the image side are provided with one or a plurality of aspherical inflection points. By forming the lens surface in this manner, coma aberration and astigmatic aberration can be satisfactorily corrected, and distortion can also be satisfactorily corrected.

As a characteristic feature of a case in which the imaging surface is a CCD or CMOS, the ray angle incorporated into each pixel is limited, and the ray angle increases towards the periphery of the image. It is also preferred to mitigate this phenomenon that a configuration be adopted whereby the periphery of the lens surface of the third lens on the image side is an inflected aspherical surface whose convex side faces the image surface, and that a maximum exit angle of a principal ray is 30 degrees or less. Aspherical correction whereby shading is prevented from occurring in the periphery of the image is thereby obtained.

An imaging lens according to a second invention of the present application comprises three elements in three groups, wherein a first lens whose meniscus has a positive power and whose convex surface faces an object side, a second lens whose meniscus has positive or negative power and whose concave surface faces the object side, and a third lens with positive power are arranged sequentially from the object side.

Among surfaces of the first, second, and third lenses, the shape of at least one lens surface is defined by an aspherical shape in which an inflection point does not occur in an effective lens surface region thereof.

Thus, since the imaging lens of the present invention is a lens system comprised of three elements in three groups, and the first lens positioned on the object side is configured as a lens with a positive meniscus whose convex surface faces the object side, the total length of the lens system can be reduced. By also making the lens surface of the second lens on the object side concave, the position of the exit pupil can be lengthened, whereby shading can be prevented. Furthermore, since an aspherical shape having no inflection point is employed in the lens surface, loss of resolution due to lens machining error or assembly error can be minimized, and production is facilitated.

In the imaging lens of the present invention herein, when a total focal distance of the imaging lens is f, a back focus thereof is BF, a focal distance of the first lens is f1, a curvature of the lens surface of the third lens on the object side is Ra, and a curvature of the lens surface of the third lens on the image side is Rb, it is preferred that conditional expressions (A) through (C) be satisfied.

$$0.5 < f1/f < 1.5 \quad (A)$$

$$0.25 < BF/f < 1.0 \quad (B)$$

$$1.0 < |Rb/Ra| \quad (C)$$

Conditional expression (A) is a condition for ensuring that spherical aberration is stable and that the lens system as a whole is compact. Below its lower limit, the lens system can be made compact, but spherical aberration becomes difficult to correct. If, conversely, its upper limit is exceeded, spherical aberration becomes easy to correct, but it becomes impossible to keep the lens system as a whole compact. By satisfying this conditional expression, the lens system can be made compact while a satisfactory state of spherical aberration is maintained.

In the present invention, the total length of the imaging lens can be reduced by making the first lens into a lens with a positive meniscus whose convex surface faces the object side, and satisfying conditional expression (A).

Conditional expression (B) is also a condition for ensuring that the lens system as a whole is more compact. Particularly in the case of an imaging lens employed in a camera installed in a mobile telephone, it is necessary to reduce the size of the lens system as a whole while at the same time reducing the total length of the lens system. The optical system is preferably designed so as to satisfy conditional expression (B) in order to satisfy these requirements. Below the lower limit of conditional expression (B), the lens system can be made compact, but the organic space between the lens system and the CCD or other imaging surface is lost, and various types of aberration become difficult to correct. Exceeding its upper limit is also not preferred, because the lens system increases in size.

Conditional expression (C) relates to the exit pupil and the back focus, and a condition in which the absolute value of the curvature Ra is equal to or greater than the absolute value of the curvature Rb is not preferred, because the exit pupil and the back focus are shortened.

Next, when the imaging surface is a CCD, CMOS, or the like, a limit is placed on the ray angle incorporated into each pixel in order to ensure substantial aperture efficiency. To mitigate this phenomenon, it is preferred that the exit pupil be lengthened and that the maximum exit angle of the principal ray be corrected to 30 degrees or less. Shading can thereby be prevented from occurring in the periphery of the image surface. Distortion can also be satisfactorily corrected by appropriately designing the aspherical shape.

BRIEF DESCRIPTION OF THE DRAWINGS

FIG. 11 is an aberration diagram of the imaging lens of Example A shown in FIG. 10;

FIG. 13 is an aberration diagram of the imaging lens of Example B shown in FIG. 12; and FIG. 14 is an aberration diagram of the imaging lens of Example C in which the second invention of the present application is applied.

BEST MODE FOR CARRYING OUT THE INVENTION

Examples of the imaging lens having a three-group, three-element structure according to the present invention will be described hereinafter with reference to the drawings.

EXAMPLE 1

Figure 1:
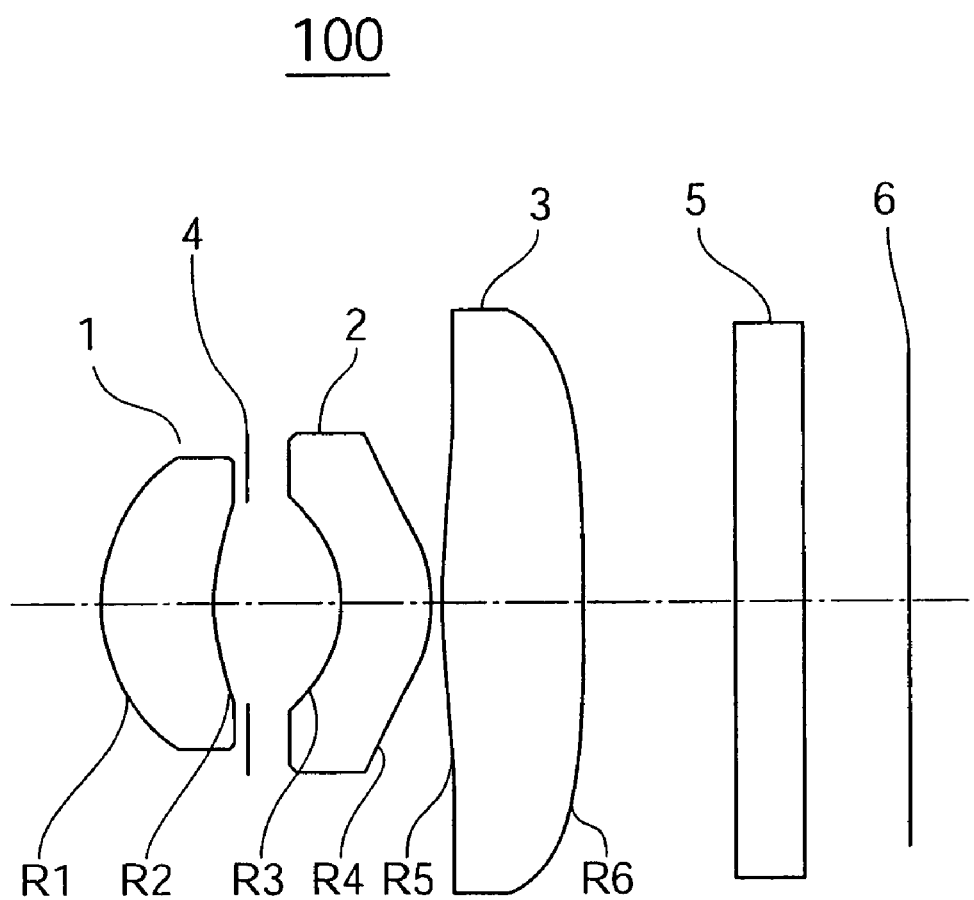
FIG. 1 is a structural diagram of the imaging lens according to Example 1 in which the first invention of the present application is applied.

An imaging lens according to Example 1 in which the first invention of the present application is applied is depicted in FIG. 1. An imaging lens 100 of the present example has, arranged in sequence from an object side towards an imaging surface 6, a first lens 1 whose meniscus has a positive power and whose convex surface faces the object side; a second lens 2 whose meniscus has a negative power and whose concave surface faces the object side, positioned subsequently via an aperture 4; and a third lens 3 having a positive power; and the second and third lenses function as correction lenses. In the present example, all of the lens surfaces on both sides of lenses 1, 2, and 3 are aspherical. In the present example, a cover glass 5 is mounted between the second lens surface R6 of the third lens 3 and the imaging surface 6.

In the third lens 3, an aspherical inflection point is provided in the location of substantially 50% of the aperture diameter in the first lens surface R5, and an aspherical inflection point is provided in the vicinity of substantially 25% of the aperture diameter in the second lens surface R6. The annular zone of the lens periphery of the third lens 3 thereby forms a convex surface towards the imaging surface side, and the maximum exit angle of the principal ray is adjusted to 22 degrees with respect to the total angle of view of 63 degrees.

The lens data for the entire optical system of the imaging lens 100 of the present example are as follows.

F-number: 3.5
Focal distance: f=5.7 mm
Total length: Σd=7.06 mm

The lens data for the lens surfaces of the imaging lens 100 of the present example are shown in Table 1A; and the aspherical coefficients for determining the aspherical shape of the lens surfaces are shown in Table 1B.

In Table 1A, i indicates the sequence of lens surfaces counted from the object side; R indicates the curvature of each of the lens surfaces; d indicates the distance between lens surfaces; Nd indicates the refractive index of each of the lenses; and vd indicates the Abbe number of the lenses. An asterisk (*) by the i of a lens surface indicates that the lens surface is aspherical.

When the axis in the optical axis direction is X, the height in the direction perpendicular to the optical axis is H, the conical coefficient is k, and the aspherical coefficients are A, B, C, and D, the aspherical shape employed in the lens surface is indicated by the following equation.

$$X = \frac{\frac{H^2}{R}}{1 + \sqrt{1 - (k-1)\left(\frac{H}{R}\right)^2}} + AH^4 + BH^6 + CH^8 + DH^{10}$$

The meanings of the symbols and the equations for indicating the aspherical shapes are the same in Examples 2, 3, 4, and 5. In the present example, since f1/f=0.84, Σd/f=1.24, and vd2=29, conditional expressions (1) through (3) are satisfied.

Figure 3:
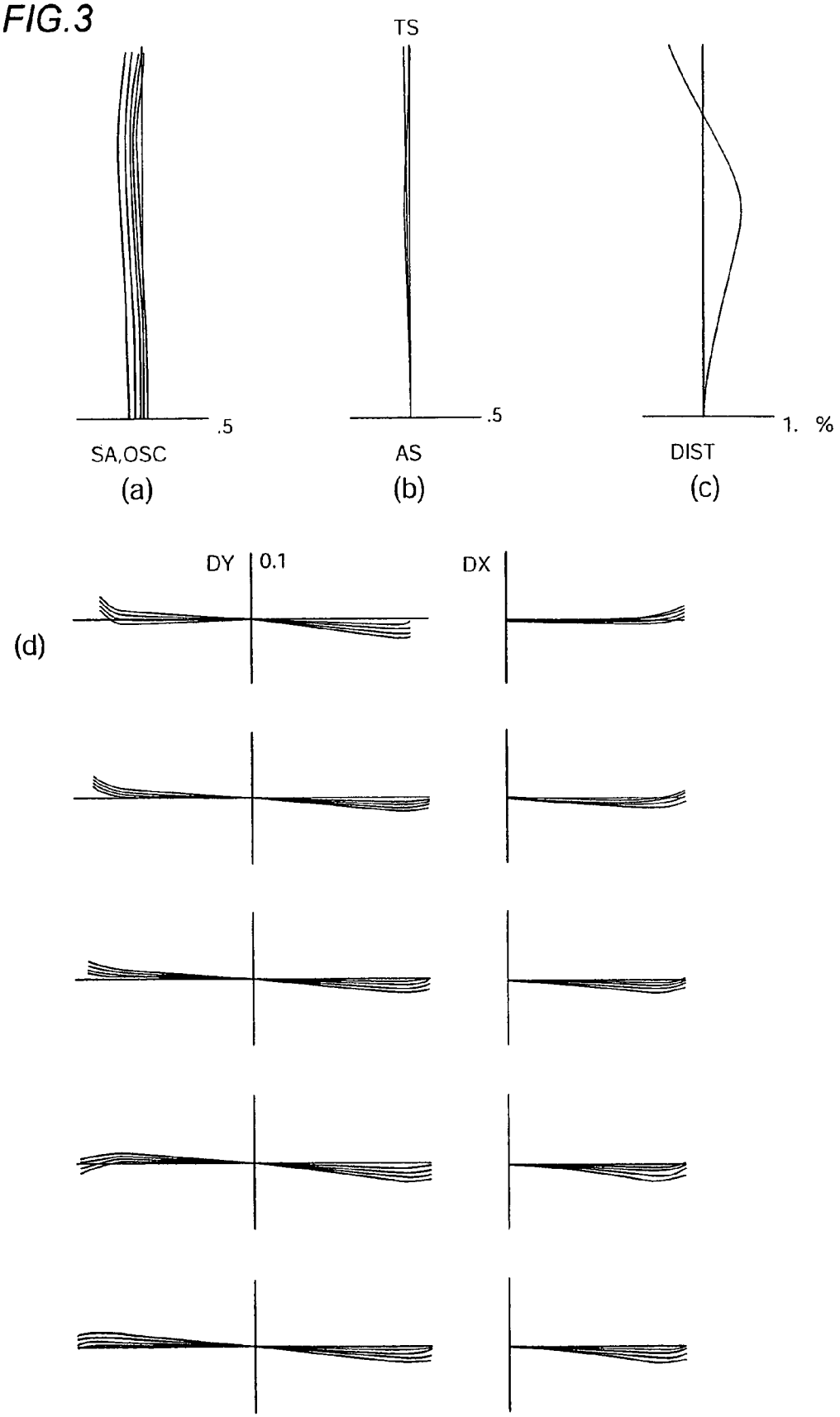
FIG. 3 is an aberration diagram of the imaging lens of Example 1 shown in FIG. 1.

FIG. 3 is an aberration diagram showing aberrations in the imaging lens 100 of Example 1. In the diagram, SA indicates the spherical aberration, OSC indicates the sine condition, AS indicates the astigmatic aberration, and DIST indicates the distortion. The T in the astigmatic aberration AS indicates a tangential image surface, and the S indicates a sagittal image surface. The aberration diagram at the bottom of the figure shows the lateral aberration, and in the figure, DX indicates the laterally directed X aberration relating to the X pupil coordinate; and DY indicates the laterally directed Y aberration relating to the Y pupil coordinate. The meanings of these symbols are also the same in the aberration diagrams showing the aberration in Examples 2, 3, 4, and 5.

EXAMPLE 2

Figure 2:
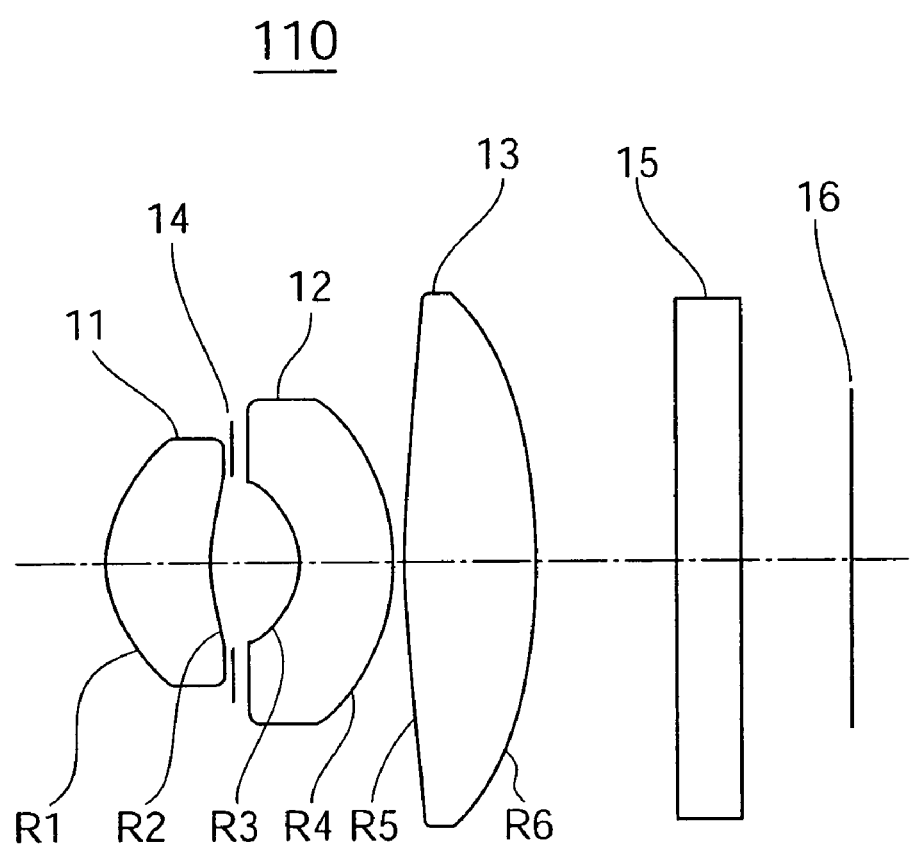
FIG. 2 is a structural diagram of the imaging lens according to Example 2 in which the first invention of the present application is applied.

FIG. 2 is a structural diagram of an imaging lens according to Example 2 in which the first invention of the present application is applied. In an imaging lens 110 of the present example, a first lens 11 with a positive meniscus whose convex surface faces an object side, a second lens 12 with a negative meniscus whose concave surface faces the object side, positioned via an aperture 14, and a third lens 13 that is a biconvex lens are arranged in sequence from the object side towards an imaging surface 16. An aspherical inflection point is provided in the location of substantially 48% of the lens aperture diameter in the first lens surface R5 of the third lens 13 on the object side. The second lens surface R6 thereof on the image side is formed as an extension of the convex surface. Forming the lens surface of the third lens 13 in this

TABLE 1A

FNo.: 3.5; f = 5.7 mm; Σd = 7.06 mm

| i | R | d | Nd | vd |
|---|---|---|---|---|
| 1* | 1.73 | 1.0 | 1.5247 | 56.2 |
| 2* | 4.46 | 0.15 | | |
| 3 | 0.00 | 0.4 | | |
| 4 | 0.00 | 0.5 | | |
| 5* | −1.052 | 0.8 | 1.585 | 29.0 |
| 6* | −1.50 | 0.1 | | |
| 7* | 5.75 | 1.2 | 1.5247 | 56.2 |
| 8* | 15.25 | 1.336 | | |
| 9 | 0.00 | 0.6 | 1.51633 | 64.2 |
| 10 | 0.00 | 0.9779 | | |
| 11 | | | | |

(*indicates an aspherical shape)

TABLE 1B

| i | k | A | B | C | D |
|---|---|---|---|---|---|
| 1 | $4.740865 \times 10^{-2}$ | $5.067696 \times 10^{-3}$ | $4.581707 \times 10^{-3}$ | $-6.222765 \times 10^{-3}$ | $3.890559 \times 10^{-3}$ |
| 2 | $3.767275 \times 10^{-1}$ | $3.143529 \times 10^{-3}$ | $-1.939397 \times 10^{-2}$ | $9.886734 \times 10^{-2}$ | $-9.132532 \times 10^{-2}$ |
| 5 | $-3.275267 \times 10^{-1}$ | $1.603653 \times 10^{-2}$ | $6.356242 \times 10^{-2}$ | $2.087871 \times 10^{-5}$ | $-3.891845 \times 10^{-2}$ |
| 6 | $-1.071306$ | $-7.703536 \times 10^{-3}$ | $1.776501 \times 10^{-2}$ | | |
| 7 | $2.361313$ | $-1.916465 \times 10^{-2}$ | $6.266366 \times 10^{-4}$ | $5.086988 \times 10^{-6}$ | $6.795863 \times 10^{-7}$ |
| 8 | $0.00$ | $-2.213400 \times 10^{-2}$ | $7.502348 \times 10^{-4}$ | $-3.884072 \times 10^{-5}$ | $-1.070020 \times 10^{-5}$ | manner allows the maximum exit angle of the principal ray to be 23.5 degrees with respect to the total angle of view of 63 degrees. The lens surfaces of the first lens 11, second lens 12, and third lens 13 of the present example are also all aspherical. A cover glass 15 is also mounted in the present example between the second lens surface R6 of the third lens 13 and the imaging surface 16.

The lens data for the entire optical system of the imaging lens 110 of the present example are as follows.

F-number: 3.5
Focal distance: f=5.7 mm
Total length: Σd=6.985 mm

Figure 4:
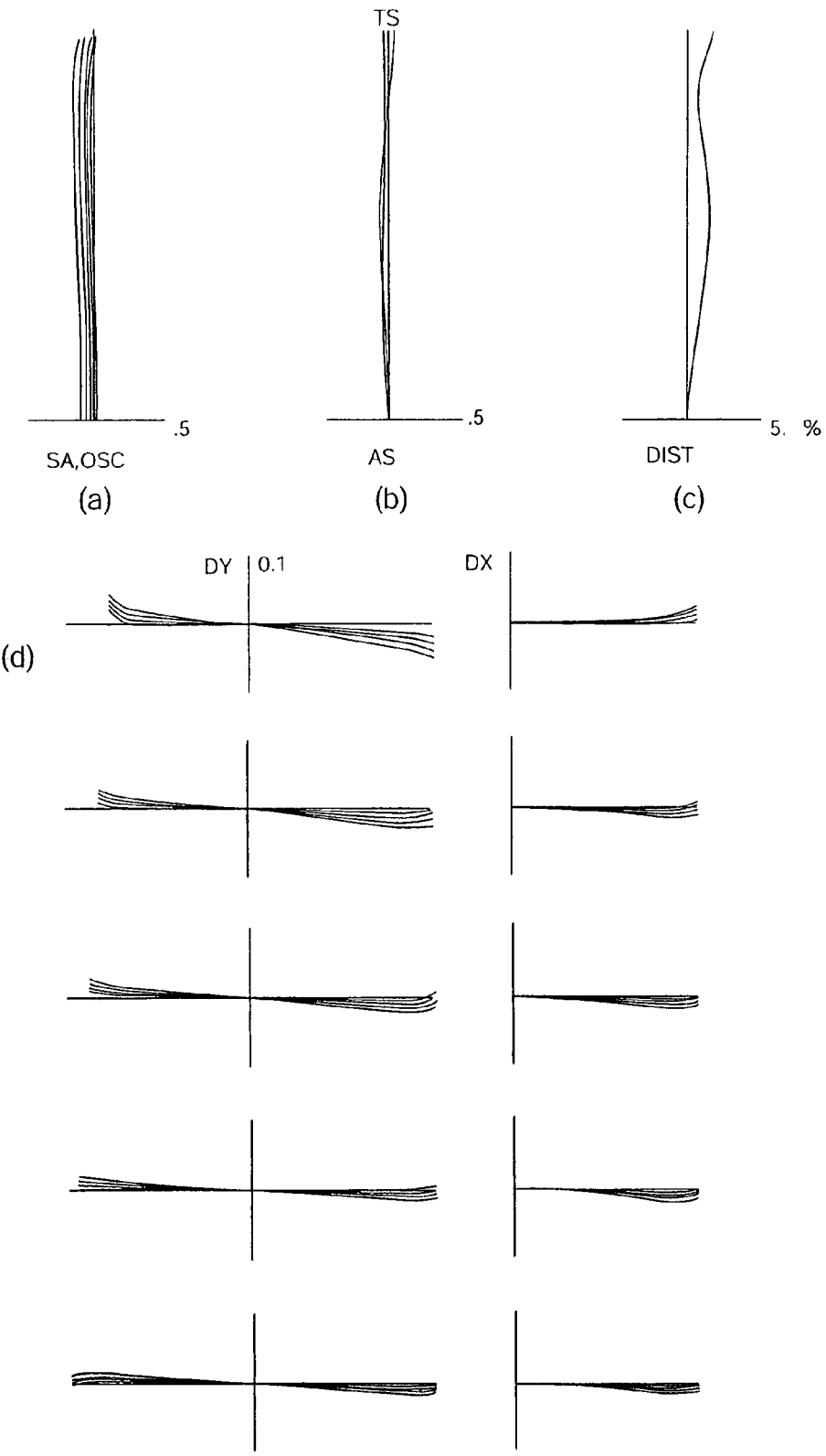
FIG. 4 is an aberration diagram of the imaging lens of Example 2 shown in FIG. 2.

The lens data for the lens surfaces of the imaging lens 110 of the present example are shown in Table 2A; and the aspherical coefficients for determining the aspherical shape of the lens surfaces are shown in Table 2B. In the present example, since f1/f=0.70, Σd/f=1.23, and vd2=29, conditional expressions (1) through (3) are satisfied. The aberration diagram thereof is shown in FIG. 4.

TABLE 2A

| FNo.: 3.5; f = 5.7 mm; Σd = 6.985 mm | | | | |
|---|---|---|---|---|
| i | R | d | Nd | vd |
| 1* | 1.386 | 1.0 | 1.5247 | 56.2 |
| 2* | 3.087 | 0.15 | | |
| 3 | 0.00 | 0.18 | | |
| 4 | 0.00 | 0.47 | | |
| 5* | −0.953 | 0.9 | 1.585 | 29.0 |
| 6* | −2.016 | 0.1 | | |
| 7* | 6.57 | 1.2 | 1.5247 | 56.2 |
| 8* | −6.15 | 1.336 | | |
| 9 | 0.00 | 0.6 | 1.51633 | 64.2 |
| 10 | 0.00 | 1.0489 | | |
| 11 | | | | |

(*indicates an aspherical shape)

TABLE 2B

| i | k | A | B | C | D |
|---|---|---|---|---|---|
| 1 | $-2.414289 \times 10^{-1}$ | $1.704389 \times 10^{-2}$ | $-7.630913 \times 10^{-4}$ | $1.397945 \times 10^{-2}$ | $-5.89427 \times 10^{-3}$ |
| 2 | $7.215993 \times 10^{-1}$ | $-3.474378 \times 10^{-3}$ | $-7.800064 \times 10^{-2}$ | $9.886734 \times 10^{-2}$ | $-9.132532 \times 10^{-2}$ |
| 5 | $5.484851 \times 10^{-1}$ | $1.097456 \times 10^{-1}$ | $-2.023164 \times 10^{-1}$ | $5.6317100 \times 10^{-1}$ | $-5.506715 \times 10^{-1}$ |
| 6 | $-1.456663$ | $-2.197336 \times 10^{-2}$ | $-1.003731 \times 10^{-2}$ | | |
| 7 | $-3.168123$ | $-1.446476 \times 10^{-2}$ | $1.192514 \times 10^{-3}$ | $3.793835 \times 10^{-5}$ | $-7.112863 \times 10^{-6}$ |
| 8 | 0.00 | $-1.342604 \times 10^{-3}$ | $-1.088183 \times 10^{-3}$ | $-8.566835 \times 10^{-6}$ | $7.766112 \times 10^{-6}$ |

In the imaging lenses 100 and 110 of Examples 1 and 2 above, lenses having aspherical surfaces on both sides are used as the first lenses 1 and 11 on the object side, but lenses having spherical surfaces on both sides, or lenses in which at least one of the two surfaces is aspherical may also be used for the first lenses.

EXAMPLE 3

Figure 5:
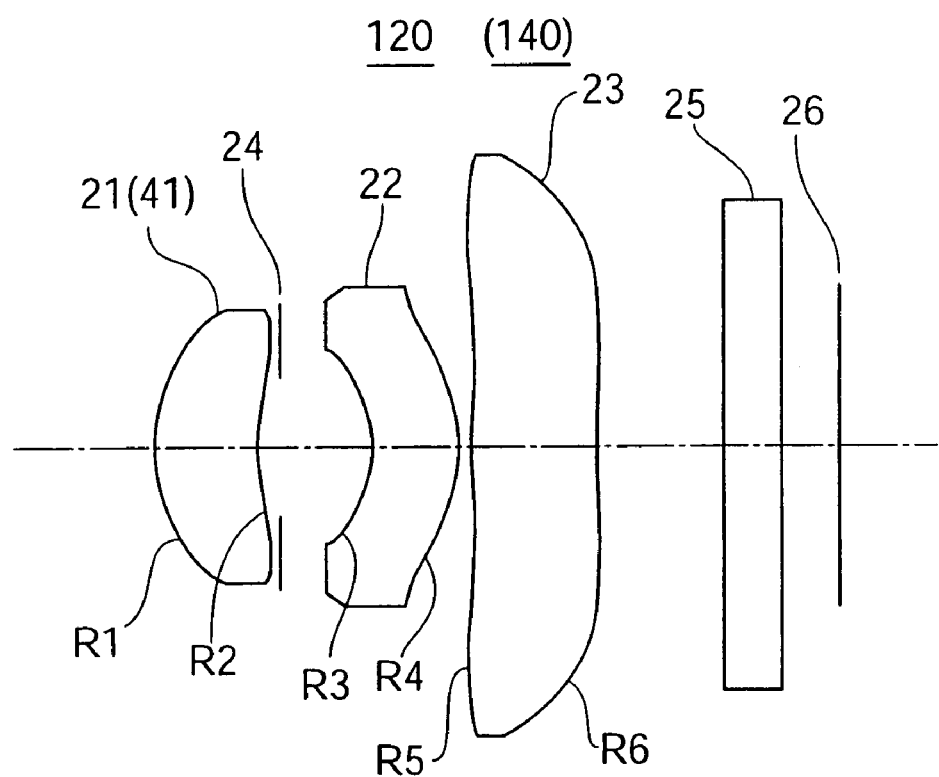
FIG. 5 is a structural diagram of the imaging lens according to Examples 3 and 5 in which the first invention of the present application is applied.

An imaging lens according to Example 3 in which the first invention of the present application is applied is shown in FIG. 5. An imaging lens 120 of the present example has, arranged in sequence from an object side towards an imaging surface 26, a first lens 21 whose meniscus has a positive power and whose convex surface faces the object side; a second lens 22 whose meniscus has a negative power and whose concave surface faces the object side, positioned subsequently via an aperture 24; and a third lens 23 having a negative power; and the second and third lenses function as correction lenses. A cover glass 25 is mounted between the third lens 23 and the imaging surface 26. In the third lens 23, the second lens surface R6 on the side of the imaging surface is formed so that the annular zone of the lens periphery forms a convex surface towards the imaging surface side, and the maximum exit angle of the principal ray is adjusted to 24 degrees or less.

In the present example, the both lens surfaces of the first lens 21 among the lenses 21, 22, and 23 are spherical. The lens surfaces on the both sides of the second and third lenses 22 and 23 are aspherical, the same as in Examples 1 and 2.

The lens data for the entire optical system of the imaging lens 120 of the present example are as follows.

F-number: 3.5
Focal distance: f=5.7 mm
Total length: Σd=6.46 mm

Figure 7:
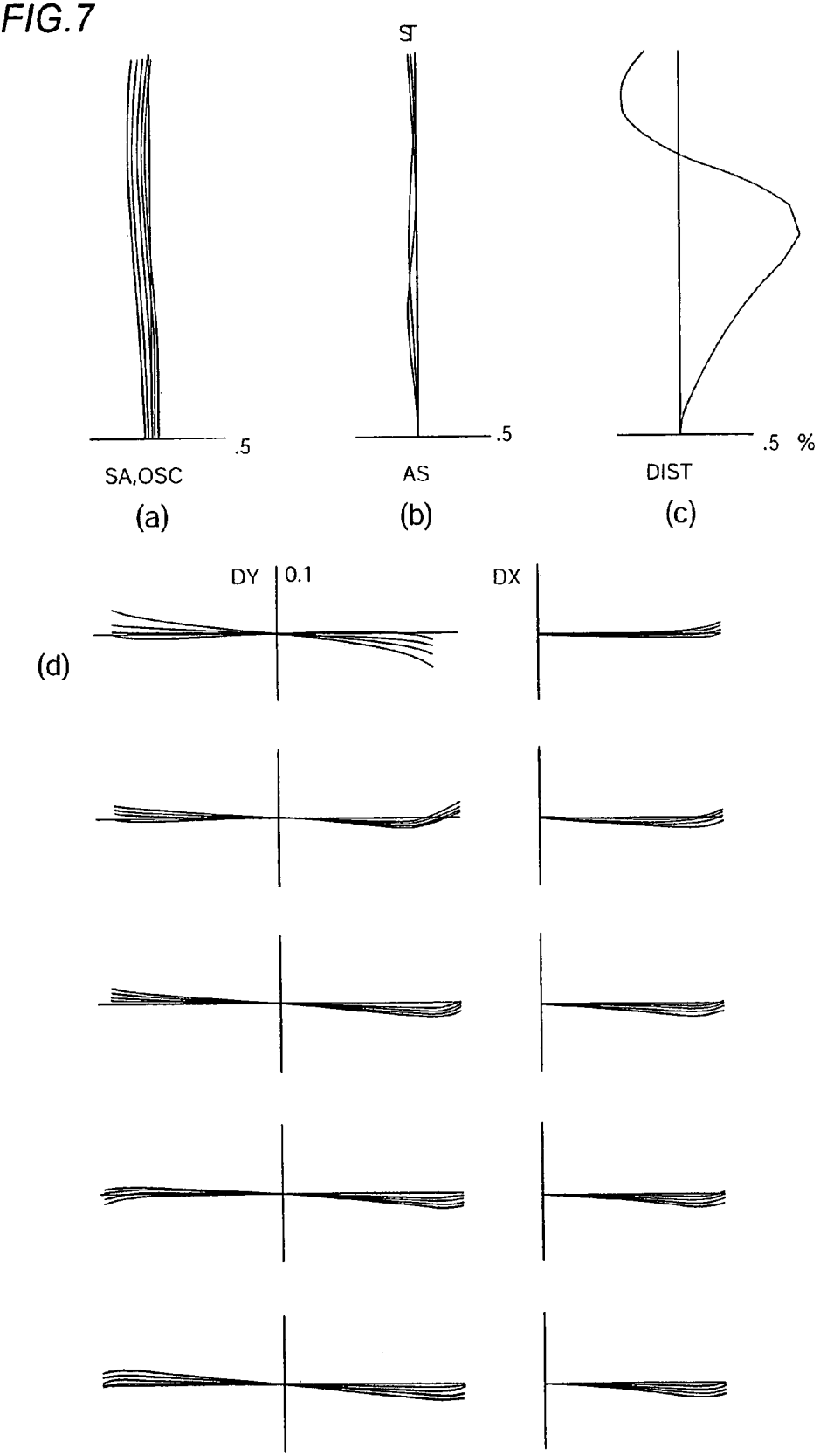
FIG. 7 is an aberration diagram of the imaging lens of Example 3 shown in FIG. 5.

The lens data for the lens surfaces of the imaging lens 120 of the present example are shown in Table 3A; and the aspherical coefficients for determining the aspherical shape of the lens surfaces are shown in Table 3B. In the present example, since f1/f=0.73, Σd/f=1.13, and vd2=29, conditional expressions (1) through (3) are satisfied. The aberration diagram thereof is shown in FIG. 7.

TABLE 3A

| FNo.: 3.5; f = 5.7 mm; Σd = 6.46 mm | | | | |
|---|---|---|---|---|
| i | R | d | Nd | vd |
| 1 | 1.621 | 1.0 | 1.5247 | 56.2 |
| 2 | 5.009 | 0.15 | | |

TABLE 3A-continued

| FNo.: 3.5; f = 5.7 mm; Σd = 6.46 mm | | | | |
|---|---|---|---|---|
| i | R | d | Nd | vd |
| 3 | 0.00 | 0.4 | | |
| 4 | 0.00 | 0.5 | | |
| 5* | −1.207 | 0.8 | 1.585 | 29.0 |
| 6* | −1.644 | 0.1 | | |
| 7* | 10.993 | 1.2 | 1.5247 | 56.2 |
| 8* | 7.773 | 1.336 | | |
| 9 | 0.00 | 0.6 | 1.51633 | 64.2 |
| 10 | 0.00 | 0.3726 | | |
| 11 | | | | |

(*indicates an aspherical shape)

TABLE 3B

| i | k | A | B | C | D |
|---|---|---|---|---|---|
| 5 | $-2.567837 \times 10^{-1}$ | $3.208279 \times 10^{-2}$ | $-1.916911 \times 10^{-1}$ | $3.791361 \times 10^{-1}$ | $-3.067684 \times 10^{-1}$ |
| 6 | $-9.161619 \times 10^{-1}$ | $-2.732818 \times 10^{-3}$ | $1.984030 \times 10^{-2}$ | | |
| 7 | 6.274432 | $-2.566783 \times 10^{-2}$ | $3.344091 \times 10^{-3}$ | $8.712945 \times 10^{-5}$ | $-2.670618 \times 10^{-5}$ |
| 8 | 0.00 | $-3.171232 \times 10^{-2}$ | $1.875582 \times 10^{-3}$ | $-2.705621 \times 10^{-4}$ | $1.570770 \times 10^{-5}$ |

EXAMPLE 4

Figure 6:
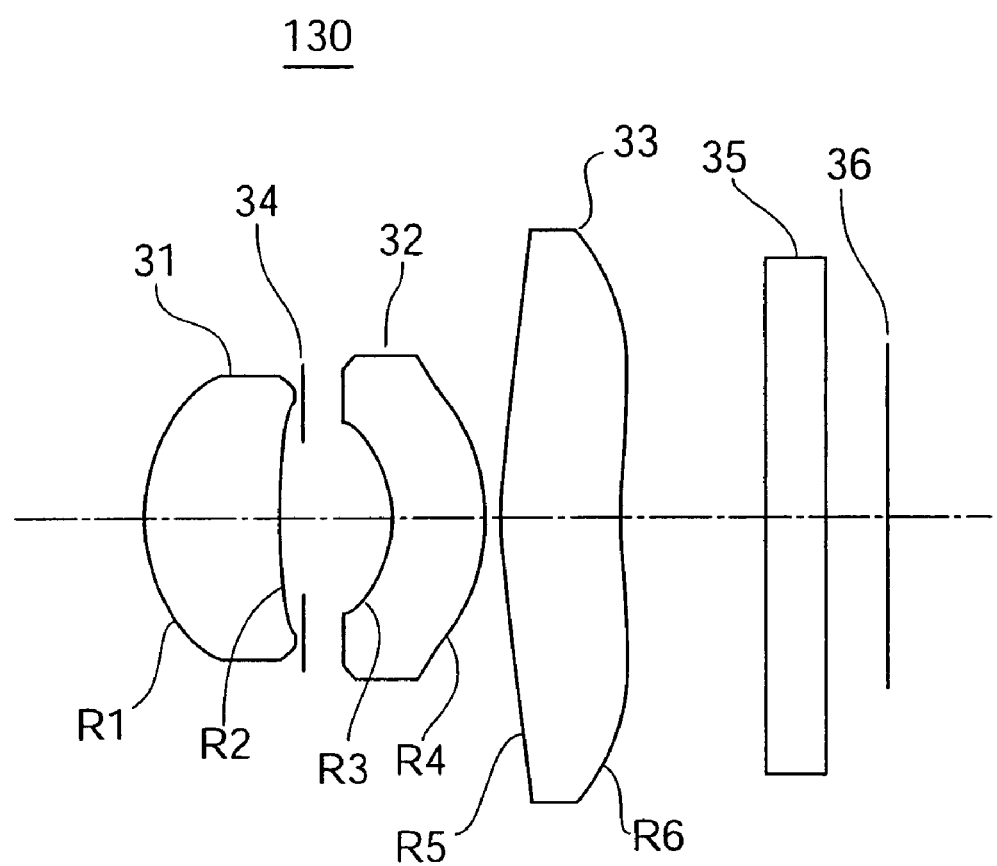
FIG. 6 is a structural diagram of the imaging lens according to Example 4 in which the first invention of the present application is applied.

FIG. 6 is a structural diagram of an imaging lens according to Example 4 in which the first invention of the present application is applied. In an imaging lens 130 of the present example, a first lens 31 with a positive meniscus whose convex surface faces an object side, a second lens 32 with a negative meniscus whose concave surface faces the object side via an aperture 34, and a third lens 33 having a positive power are arranged in sequence from the object side towards an imaging surface 36. A cover glass 35 is mounted between the third lens 33 and the imaging surface 36. In the third lens 33, the second lens surface R6 is formed so that the annular zone of the lens periphery forms a convex surface towards the imaging surface side, and the maximum exit angle of the principal ray is adjusted to 24 degrees or less.

In the present example, the both lens surfaces of the first lens 31 among the lenses 31, 32, and 33 are spherical. The lens surfaces on the both sides of the second and third lenses 32 and 33 are aspherical, the same as in Examples 1, 2 and 3.

The lens data for the entire optical system of the imaging lens 130 of the present example are as follows.

F-number: 3.5
Focal distance: f=5.7 mm
Total length: Σd=6.66 mm

Figure 8:
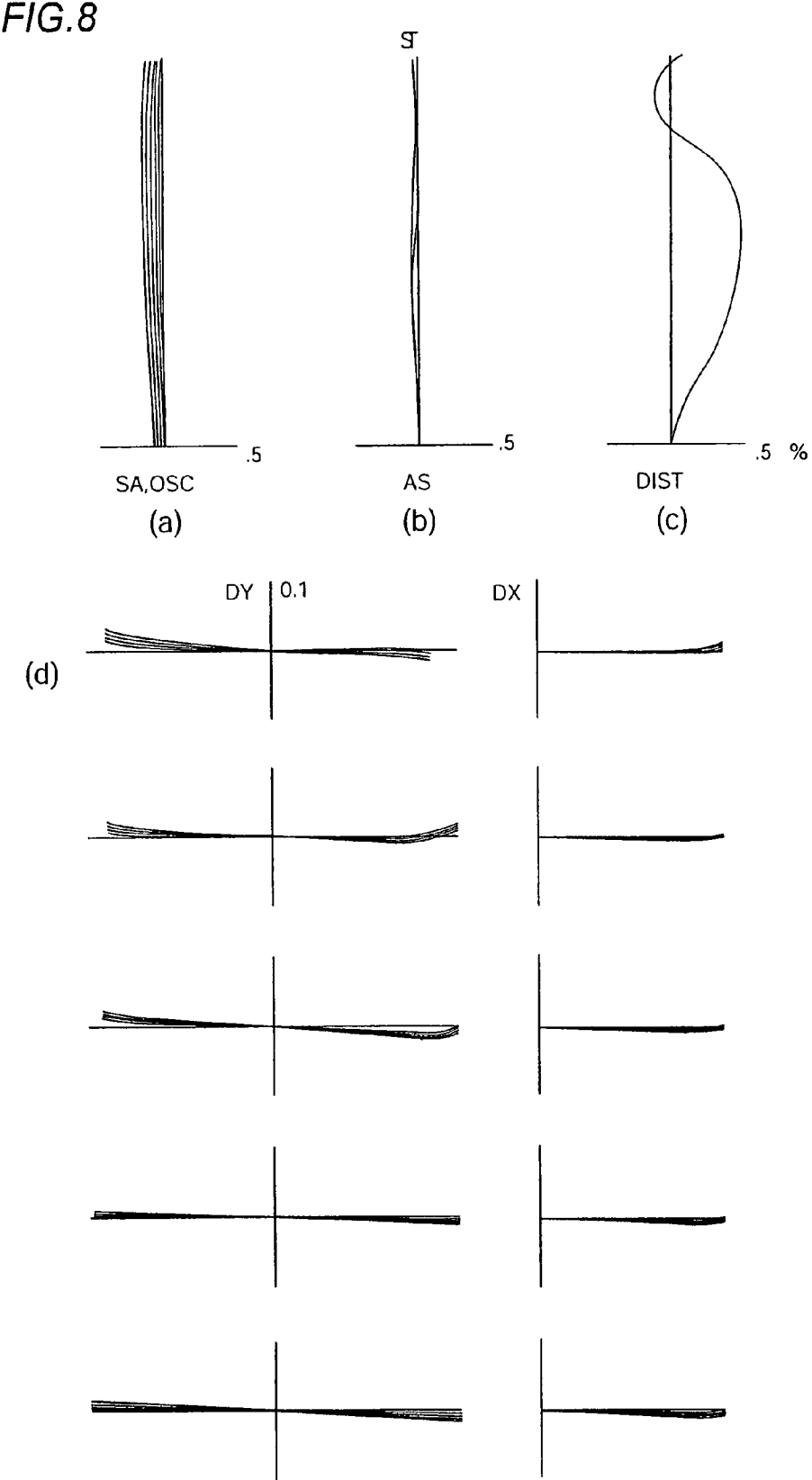
FIG. 8 is an aberration diagram of the imaging lens of Example 4 shown in FIG. 6.

The lens data for the lens surfaces of the imaging lens 130 of the present example are shown in Table 4A; and the aspherical coefficients for determining the aspherical shape of the lens surfaces are shown in Table 4B. In the present example, since f1/f=0.77, Σd/f=1.17, and vd2=29, conditional expressions (1) through (3) are satisfied. The aberration diagram thereof is shown in FIG. 8.

TABLE 4A

FNo.: 3.5; f = 5.7 mm; Σd = 6.66 mm

| i | R | d | Nd | vd |
|---|---|---|---|---|
| 1 | 1.626 | 1.2 | 1.4970 | 81.6 |
| 2 | 4.76 | 0.15 | | |
| 3 | 0.00 | 0.4 | | |
| 4 | 0.00 | 0.5 | | |
| 5* | −1.036 | 0.8 | 1.585 | 29.0 |
| 6* | −1.51 | 0.1 | | |
| 7* | 4.90 | 1.1 | 1.5247 | 56.2 |
| 8* | 6.80 | 0.81 | | |
| 9 | 0.00 | 0.6 | 1.51633 | 64.2 |
| 10 | 0.00 | 1.0 | | |
| 11 | | | | |

(*indicates an aspherical shape)

EXAMPLE 5

Referring again to FIG. 5, an imaging lens 140 will be described wherein instead of the first lens 21 in which the both lens surfaces are spherical in the imaging lens 120 of Example 3, a first lens 41 is used in which one lens surface is formed with an aspherical surface, and the other lens surface is formed with a spherical surface. In FIG. 5, symbols indicating the imaging lens 140 and the first lens 41 are enclosed in parentheses, the configuration of the other parts thereof is the same as in Example 3, and a description will therefore be given using the same symbols.

The imaging lens 140 of the present example has, arranged in sequence from an object side towards an imaging surface 26, the first lens 41 whose meniscus has a positive power and whose convex surface faces the object side; a second lens 22 whose meniscus has a negative power and whose concave surface faces the object side via an aperture 24; and a third lens 23 having a positive power; and the second and third lenses function as correction lenses. A cover glass 25 is mounted between the third lens 23 and the imaging surface 26. In the third lens 23, the second lens surface R6 is formed so that the annular zone of the lens periphery forms a convex surface towards the imaging surface, and the maximum exit angle of the principal ray is adjusted to 24 degrees or less.

In the present example, of the two lens surfaces of the first lens 41 among the lenses 41, 22, and 23, the first lens surface R1 on the object side thereof is aspherical, and the second lens surface R2 on the imaging surface side thereof is spherical. The lens surfaces on the both sides of the second and third lenses 22 and 23 are aspherical.

The lens data for the entire optical system of the imaging lens 140 of the present example are as follows.

F-number: 3.5
Focal distance: f=5.7 mm
Total length: Σd=7.07 mm

Figure 9:
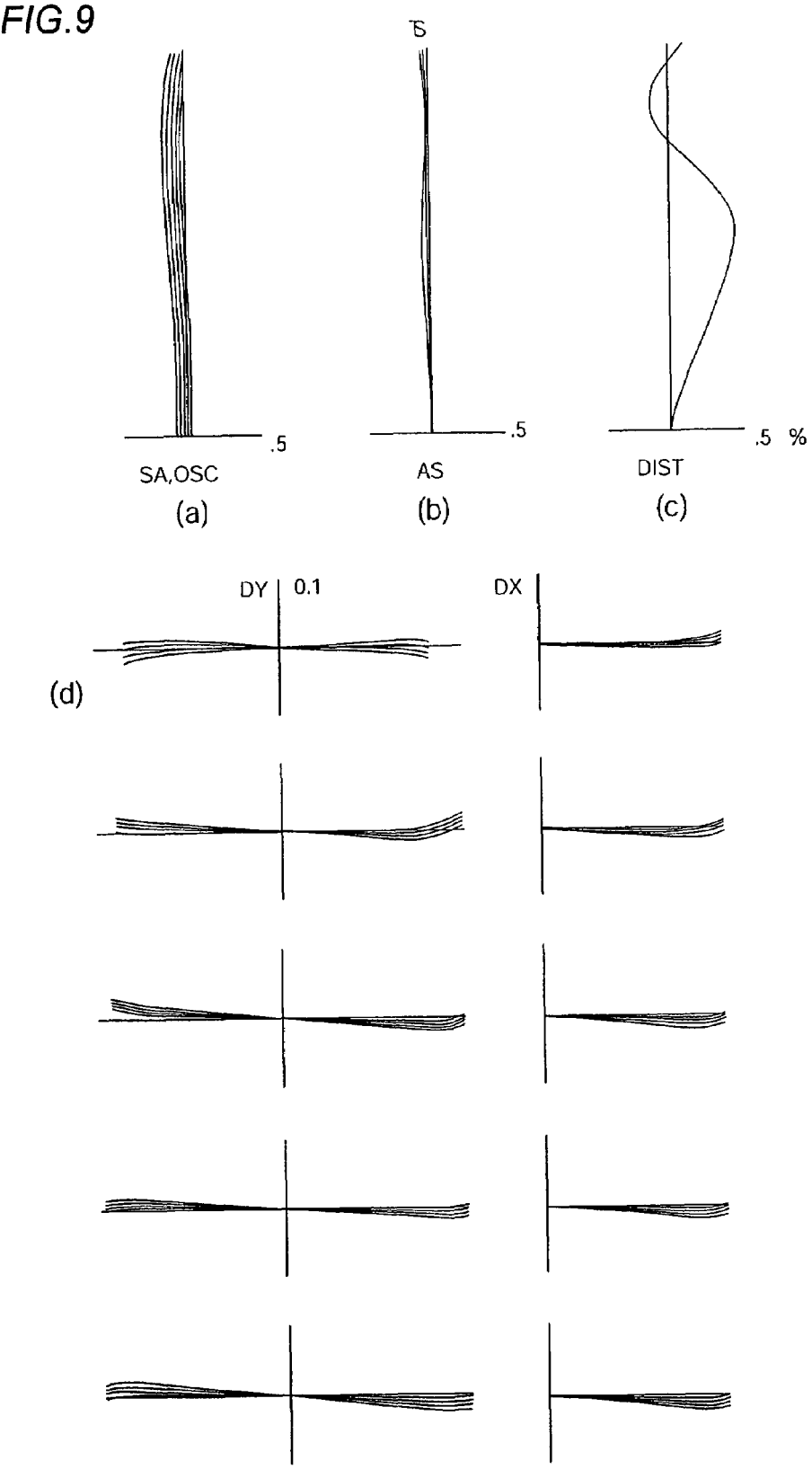
FIG. 9 is an aberration diagram of the imaging lens of Example 5 shown in FIG. 5.

The lens data for the lens surfaces of the imaging lens 140 of the present example are shown in Table 5A; and the aspherical coefficients for determining the aspherical shape of the lens surfaces are shown in Table 5B. In the present example, since f1/f=0.83, Σd/f=1.24, and vd2=29, conditional expressions (1) through (3) are satisfied. The aberration diagram thereof is shown in FIG. 9.

TABLE 4B

| i | k | A | B | C | D |
|---|---|---|---|---|---|
| 5 | $-6.210503 \times 10^{-1}$ | $3.611876 \times 10^{-2}$ | $-2.806078 \times 10^{-1}$ | $5.465960 \times 10^{-1}$ | $-4.831922 \times 10^{-1}$ |
| 6 | −1.143408 | $4.811894 \times 10^{-3}$ | $1.896129 \times 10^{-3}$ | | |
| 7 | 1.531998 | $-2.174083 \times 10^{-2}$ | $2.450461 \times 10^{-3}$ | $-2.581896 \times 10^{-4}$ | $1.113489 \times 10^{-5}$ |
| 8 | 0.00 | $-3.318003 \times 10^{-2}$ | $4.413864 \times 10^{-3}$ | $-5.477590 \times 10^{-4}$ | $2.739709 \times 10^{-5}$ |

TABLE 5A

FNo.: 3.5; f = 5.7 mm; Σd = 7.07 mm

| i | R | d | Nd | νd |
|---|---|---|---|---|
| 1* | 1.77 | 1.0 | 1.5247 | 56.2 |
| 2 | 4.973 | 0.15 | | |
| 3 | 0.00 | 0.4 | | |
| 4 | 0.00 | 0.5 | | |
| 5* | −1.074 | 0.8 | 1.5850 | 29.0 |
| 6* | −1.584 | 0.1 | | |
| 7* | 5.516 | 1.2 | 1.5247 | 56.2 |
| 8* | 19.41 | 1.336 | | |
| 9 | 0.00 | 0.6 | 1.51633 | 64.2 |
| 10 | 0.00 | 0.985 | | |
| 11 | | | | |

(*indicates an aspherical shape)

TABLE 5B

| i | K | A | B | C | D |
|---|---|---|---|---|---|
| 1 | $-4.356005 \times 10^{-2}$ | $8.423055 \times 10^{-3}$ | $-4.071931 \times 10^{-3}$ | $4.637228 \times 10^{-3}$ | $-1.088690 \times 10^{-3}$ |
| 5 | $-3.998108 \times 10^{-1}$ | $3.950244 \times 10^{-2}$ | $-4.246316 \times 10^{-2}$ | $1.535713 \times 10^{-1}$ | $-1.460498 \times 10^{-1}$ |
| 6 | $-1.324467$ | $-1.748017 \times 10^{-3}$ | $1.297864 \times 10^{-2}$ | | |
| 7 | $3.313169$ | $-2.172623 \times 10^{-2}$ | $1.551952 \times 10^{-3}$ | $-2.195645 \times 10^{-5}$ | $-1.380375 \times 10^{-5}$ |
| 8 | $0.00$ | $-2.288283 \times 10^{-2}$ | $1.359618 \times 10^{-3}$ | $-1.163401 \times 10^{-4}$ | $1.446310 \times 10^{-6}$ |

EXAMPLE A

Figure 10:
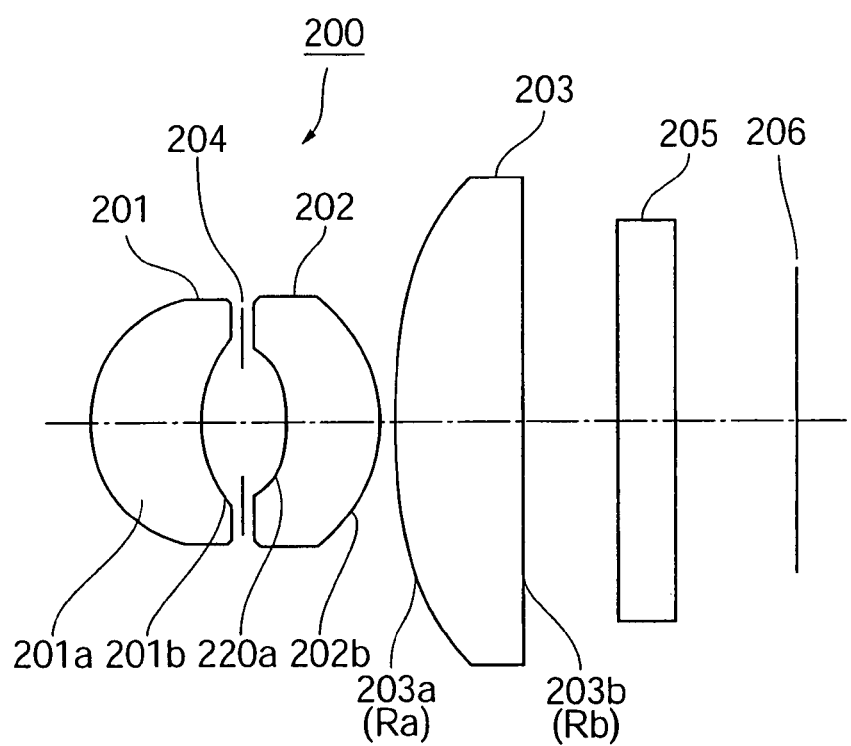
FIG. 10 is a structural diagram of the imaging lens of Example A in which the second invention of the present application is applied.

FIG. 10 is a structural diagram of an imaging lens according to Example A in which the second invention of the present application is applied. In an imaging lens 200, a first lens 201 whose meniscus has a positive power and whose convex surface faces an object side, an aperture 204, a second lens 202 whose meniscus has a negative power and whose concave surface faces the object side, and a third lens 203 having a positive power are arranged in sequence from the object side towards an imaging surface 206. A cover glass 205 is mounted between the second surface 203b of the third lens 203 and the imaging surface 206.

In this arrangement, the lens surfaces 201a and 201b on both sides of the first lens 201, the lens surfaces 202a and 202b on both sides of the second lens 202, and the lens surfaces 203a and 203b on both sides of the third lens 203 are aspherical. All of the aspherical shapes employed in the present example are also such that no inflection points appear in the effective lens surface regions of the lens surfaces.

The lens data for the entire optical system of the imaging lens 200 are as follows.
F-number: 2.8
Focal distance: f=3.65 mm
Back focus: BF=1.863 mm
Focal distance of first lens 201: f1=3.769 mm The lens data for the lens surfaces of the imaging lens 200 are shown in Table 6A, and the aspherical coefficients for determining the aspherical shape of the lens surfaces thereof are shown in Table 6B.

TABLE 6A

FNo.: 2.8; f = 3.65 mm

| i | R | d | Nd | νd |
|---|---|---|---|---|
| 1* | 1.153 | 0.8 | 1.5247 | 56.2 |
| 2* | 2.105 | 0.15 | | |
| 3 | 0.00 | 0.35 | | |
| 4* | −1.066 | 0.7 | 1.5850 | 29.0 |
| 5* | −1.546 | 0.1 | | |
| 6* | 3.180 | 0.9 | 1.5247 | 56.2 |
| 7* | 60.657 | 0.563 | | |

TABLE 6A-continued

FNo.: 2.8; f = 3.65 mm

| i | R | d | Nd | νd |
|---|---|---|---|---|
| 8 | 0.00 | 0.3 | 1.51633 | 64.2 |
| 9 | 0.00 | 1.0 | | |

(*indicates an aspherical shape)

TABLE 6B

| i | k | A | B | C | D |
|---|---|---|---|---|---|
| 1 | $4.577272 \times 10^{-1}$ | $-3.645425 \times 10^{-3}$ | $-2.554281 \times 10^{-2}$ | $2.607501 \times 10^{-2}$ | |
| 2 | $-2.153226$ | $5.788633 \times 10^{-2}$ | $4.7621418 \times 10^{-1}$ | | |
| 4 | $-2.641633 \times 10^{-2}$ | | | | |
| 5 | $-6.245341 \times 10^{-1}$ | | | | |
| 6 | $-1.167034 \times 10$ | $1.864785 \times 10^{-2}$ | $-1.905218 \times 10^{-3}$ | $-6.772919 \times 10^{-4}$ | $2.049794 \times 10^{-4}$ |
| 7 | $-1.749072 \times 10^{5}$ | | | | |

In Tables 6A and 6B, i indicates the sequence of lens surfaces counted from the object side; R indicates the curvature of each lens surface on the optical axis L; d indicates the distance between lens surfaces; Nd indicates the refractive index of each lens; and νd indicates the Abbe number of the lenses. An asterisk (*) by the i of a lens surface indicates that the lens surface is aspherical. The aspherical shapes employed in the lens surfaces can be indicated by the equation shown in the description of Example 1.

The meanings of each symbol and the equation for indicating the aspherical shape are also the same in Examples B and C below.

In the present example, the focal distance f1 of the first lens 201 is a value within the range of 0.5 f (=1.825 mm) and 1.5 f (=5.475 mm), and satisfies conditional expression (A). The value of BF/f is 0.5109 . . . , and satisfies conditional expression (B). Furthermore, since the curvature Ra of the lens surface 203a on the object side of the third lens 203 is 3.180, and the curvature Rb of the lens surface 203b on the image side thereof is 60.657, then Rb/Ra=19.074 . . . , and conditional expression (C) is satisfied. The maximum exit angle of the principal ray is also 30 degrees or less.

FIG. 11 is an aberration diagram showing aberrations in the imaging lens of Example A. FIG. 11(a) is an aberration diagram showing the spherical aberration SA; FIG. 11(b) is an aberration diagram showing the astigmatic aberration AS; and FIG. 11(c) is an aberration diagram showing the distortion DIST. The T in the astigmatic aberration AS indicates a tangential image surface, and the S indicates a sagittal image surface. FIG. 11(d) shows the lateral aberration, and in the figure, DX indicates the laterally directed X aberration relating to the X pupil coordinate; and DY indicates the laterally directed Y aberration relating to the Y pupil coordinate. The meanings of these symbols are also the same in Examples B and C described hereinafter.

EXAMPLE B

Figure 12:
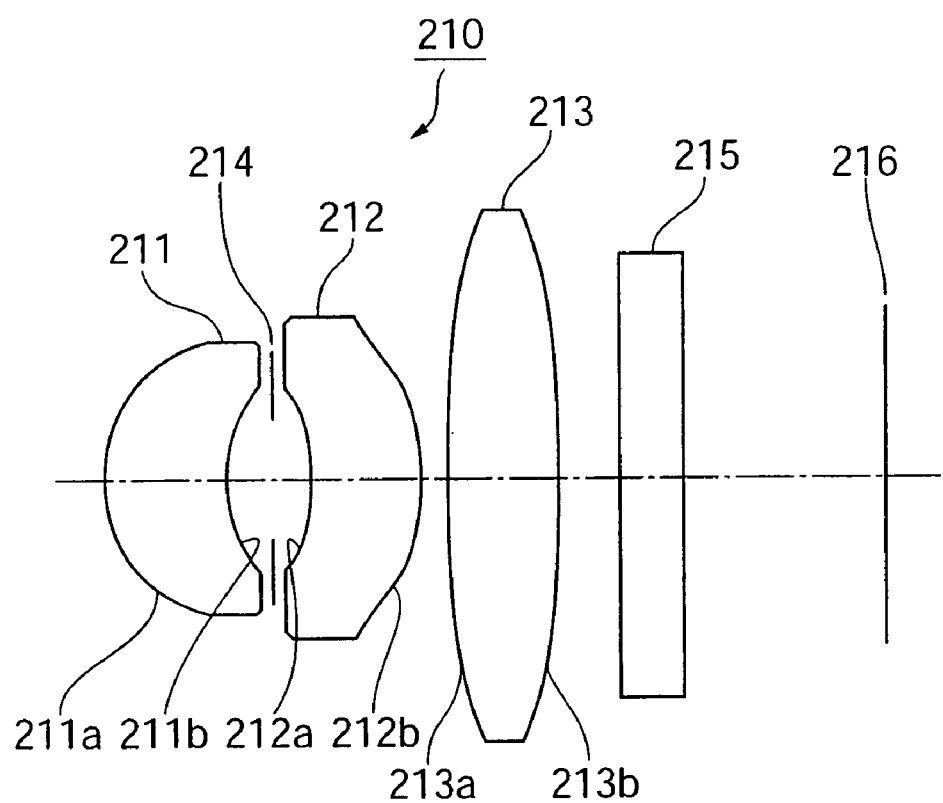
FIG. 12 is a structural diagram of the imaging lens of Examples B and C in which the second invention of the present application is applied.

FIG. 12 is a structural diagram of an imaging lens according to Example B in which the second invention of the present application is applied. In an imaging lens 210, a first lens 211 whose meniscus has a positive power and whose convex surface faces an object side, an aperture 214, a second lens 212 whose meniscus has a positive power and whose concave surface faces the object side, and a third lens 213 having a positive power are arranged in sequence from the object side towards an imaging surface 216. A cover glass 215 is mounted between the third lens 213 and the imaging surface 216, the same as in Example A. In the case of the present example, the lens surfaces 211a and 211b on both sides of the first lens 211, the lens surfaces 212a and 212b on both sides of the second lens 212, and the lens surface 213b on image side of the third lens 213 are aspherical. All of the aspherical shapes employed in the present example are also such that no inflection points appear in the effective lens surface regions of the lens surfaces.

The lens data for the entire optical system of the imaging lens of the present example are as follows.

F-number: 3.5

Focal distance: f=3.5 mm

Back focus: BF=1.992 mm

Focal distance of first lens 211: f1=4.733 mm

The lens data for the lens surfaces of the imaging lens 210 are shown in Table 7A, and the aspherical coefficients for determining the aspherical shape of the lens surfaces thereof are shown in Table 7B.

TABLE 7A

FNo.: 3.5; f = 3.50 mm

| i | R | d | Nd | vd |
|---|---|---|---|---|
| 1* | 1.155 | 0.8 | 1.5850 | 29.0 |
| 2* | 1.475 | 0.25 | | |
| 3 | 0.00 | 0.25 | | |
| 4* | −1.234 | 0.8 | 1.5247 | 56.2 |
| 5* | −1.31 | 0.15 | | |
| 6 | 5.87 | 0.75 | 1.6070 | 29.9 |
| 7* | −27.245 | 0.3 | | |
| 8 | 0.00 | 0.6 | 1.51633 | 64.2 |
| 9 | 0.00 | 1.092 | | |
| 10 | | | | |
| 11 | | | | |

(*indicates an aspherical shape)

TABLE 7B

| i | k | A | B | C | D |
|---|---|---|---|---|---|
| 1 | $6.288194 \times 10^{-1}$ | $8.880798 \times 10^{-3}$ | $-3.552012 \times 10^{-2}$ | $5.541189 \times 10^{-2}$ | $-2.595815 \times 10^{-3}$ |
| 2 | 5.605423 | $-5.846783 \times 10^{-2}$ | $3.132873 \times 10^{-1}$ | 7.279427 | $-2.513030 \times 10$ |
| 4 | 2.369842 | $1.156048 \times 10^{-1}$ | 1.324990 | | |
| 5 | $4.089558 \times 10^{-1}$ | $5.253695 \times 10^{-2}$ | $1.227547 \times 10^{-1}$ | $-5.871821 \times 10^{-2}$ | $9.212771 \times 10^{-2}$ |
| 7 | 0.00 | $-1.935001 \times 10^{-2}$ | $1.343275 \times 10^{-3}$ | | |

In the present example, the focal distance f1 of the first lens 211 is a value within the range of 0.5 f (=1.75 mm) and 1.5 f (=5.25 mm), and satisfies conditional expression (A). The value of BF/f is 0.549 . . . , and satisfies conditional expression (B). Furthermore, since the curvature Ra of the lens surface 213a on the object side of the third lens 213 is 5.87, and the curvature Rb of the lens surface 213b on the image side thereof is −27.245, then |Rb/Ra|=4.641 . . . , and conditional expression (C) is satisfied. The maximum exit angle of the principal ray is also 30 degrees or less.

FIGS. 13(a) through 13(d) are aberration diagrams showing the aberrations in the imaging lens 20 of the present example.

EXAMPLE C

The configuration of an imaging lens according to Example C in which the second invention of the present application is applied is the same as the configuration of the imaging lens 210 of Example B, and a first lens 211 whose meniscus has a positive power and whose convex surface faces an object side, an aperture 214, a second lens 212 whose meniscus has a negative power and whose concave surface faces the object side, and a third lens 213 having a positive power are arranged in sequence from the object side toward an imaging surface 216 therein. A cover glass 215 is mounted between the third lens 213 and the imaging surface 216.

Furthermore, in the present example, the lens surfaces 211a and 211b on both sides of the first lens 211, the lens surfaces 212a and 212b on both sides of the second lens 212, and the lens surfaces 213a and 213b on both sides of the third lens 213 are each aspherical. All of the aspherical shapes are also such that no inflection points appear in the effective lens surface regions of the lens surfaces.

The lens data for the entire optical system of the imaging lens of the present example are as follows.

F-number: 2.8
Focal distance: f=3.60 mm
Back focus: BF=1.967 mm
Focal distance of first lens 211: f1=3.844 mm The lens data for the lens surfaces in the imaging lens of the present example are shown in Table 8A, and the aspherical coefficients for determining the aspherical shape of the lens surfaces thereof are shown in Table 8B.

TABLE 8A

| | FNo.: 2.8; f = 3.60 mm | | | |
|---|---|---|---|---|
| i | R | d | Nd | vd |
| 1* | 1.109 | 0.85 | 1.5247 | 56.2 |
| 2* | 1.814 | 0.25 | | |
| 3 | 0.00 | 0.25 | | |
| 4* | −0.908 | 0.7 | 1.585 | 29.0 |
| 5* | −1.638 | 0.1 | | |
| 6* | 3.115 | 0.95 | 1.5247 | 56.2 |
| 7* | −4.464 | 0.4 | | |
| 8 | 0.00 | 0.3 | 1.51633 | 64.2 |
| 9 | 0.00 | 1.267 | | |
| 10 | | | | |
| 11 | | | | |

(*indicates an aspherical shape)

TABLE 8B

| i | k | A | B | C | D |
|---|---|---|---|---|---|
| 1 | $3.430395 \times 10^{-1}$ | $5.175761 \times 10^{-3}$ | $1.822436 \times 10^{-3}$ | $-3.968977 \times 10^{-2}$ | $4.390863 \times 10^{-2}$ |
| 2 | $-1.192756 \times 10$ | $2.602025 \times 10^{-1}$ | $2.316038 \times 10^{-1}$ | | |
| 4 | $4.565904 \times 10^{-1}$ | | | | |
| 5 | $-7.957068 \times 10^{-1}$ | $-1.046904 \times 10^{-1}$ | $7.812309 \times 10^{-3}$ | | |
| 6 | $-2.865732 \times 10$ | $-1.057338 \times 10^{-2}$ | $1.542895 \times 10^{-2}$ | $-6.212535 \times 10^{-3}$ | $8.950190 \times 10^{-4}$ |
| 7 | $-2.000000$ | $-7.488042 \times 10^{-3}$ | | | |

In the present example, the focal distance f1 of the first lens 211 is a value within the range of 0.5 f (=1.80 mm) and 1.5 f (=5.40 mm), and satisfies conditional expression (A). The value of BF/f is 0.546 . . . , and satisfies conditional expression (B). Furthermore, since the curvature Ra of the lens surface 213a on the object side of the third lens 213 is 3.115, and the curvature Rb of the lens surface 213b on the image side thereof is −4.464, then |Rb/Ra|=1.433 . . . , and conditional expression (C) is satisfied. The maximum exit angle of the principal ray is also 30 degrees or less.

FIGS. 14(a) through 14(d) are aberration diagrams showing the aberrations in the imaging lens of the present example.

OTHER EMBODIMENTS OF THE SECOND INVENTION

The lens surfaces on both sides of the first through third lenses are all aspherical in Examples A and C, and the lens surfaces on both sides of the first lens, on both sides of the second lens, and on the lens surface of the third lens facing the image side are aspherical in Example B. It is apparent that at least one lens surface among these lens surfaces may be aspherical, and that the other lens surfaces may be spherical.

INDUSTRIAL APPLICABILITY

As described above, the imaging lens according to the first invention of the present application is a lens composed of three elements in three groups, the second lens and third lens are correction lenses, the first lens positioned on the object side is configured as a positive meniscus, and the convex surface thereof faces the object side. As a result, the total length of the lens system can be reduced. Since the lens surface of the third lens is configured as an aspherical surface provided with one or a plurality of aspherical inflection points, various types of aberration can be satisfactorily corrected, while at the same time, the maximum exit angle of the principal ray can be reduced and shading prevented. Furthermore, aberration can be adequately corrected by the two correction lenses that include the second lens and the third lens. Therefore, according to the present invention, a small, compact imaging lens can be obtained that is adapted to high resolution on the order of millions of pixels.

Since the imaging lens according to the second invention of the present application is a lens system composed of three elements in three groups, and the first lens positioned on the object side is configured as a lens with a positive meniscus whose convex surface faces the object side, the total length of the lens system can be reduced. By also making the lens surface of the second lens facing the object side concave, the position of the exit pupil can be lengthened, whereby shading can be prevented. Furthermore, since an aspherical shape having no inflection points is employed in the lens surface, loss of resolution due to lens machining error or assembly error can be minimized, and production is facilitated. Thus, by the present invention, a small-size, compact imaging lens having a small number of constituent lens elements can be obtained that is suited for production and adapted to high resolution on the order of millions of pixels.

The invention claimed is:

1. A digital camera imaging lens comprising a first lens, a second lens, and a third lens arranged in sequence from an object side toward an imaging surface side; wherein
   the first lens is a meniscus lens having a positive power, whose convex surface faces the object side;
   the second lens is a meniscus lens having a negative power, whose concave surface faces the object side;
   the third lens is an aspherical lens having an inflection point on its object-side surface;
   an aperture stop is disposed between the first and second lenses; and
   the imaging surface is defined by an element surface of a photosensor.

2. A digital camera imaging lens according to claim 1, wherein the first lens has at least one lens surface thereof which is aspherical, and wherein the following condition is satisfied when a total focal distance of the digital camera imaging lens is f, and a focal distance of the first lens is f1:

$0.5 < f1/f < 1.5$.

3. The digital camera imaging lens according to claim 2, wherein the third lens has a peripheral portion of its lens surface on the imaging surface side, the peripheral portion being convex towards the imaging surface side; and a maximum exit angle of a principal ray in the digital camera imaging lens is 30 degrees or less.

4. The digital camera imaging lens according to claim 1, wherein the third lens has a peripheral portion of its lens surface on the imaging surface side, the peripheral portion being convex towards the imaging surface side; and a maximum exit angle of a principal ray in the digital camera imaging lens is 30 degrees or less.

5. A digital camera imaging lens comprising a first lens, a second lens, and a third lens arranged in sequence from an object side toward an imaging surface side; wherein the first lens is a meniscus lens having a positive power, whose convex surface faces the object side;

the second lens is a meniscus lens having a negative power, whose concave surface faces the object side;

the third lens is an aspherical lens having at least one inflection point; and the imaging surface is defined by an element surface of a photosensor.

6. A digital camera imaging lens according to claim 5, wherein the first lens has at least one lens surface thereof which is aspherical, and wherein the following condition is satisfied when a total focal distance of the digital camera imaging lens is f, and a focal distance of the first lens is f1:

$0.5 < f1/f < 1.5$.

7. The digital camera imaging lens according to claim 5, wherein the following condition is satisfied when a total focal distance of the digital camera imaging lens is f, and a distance from an incident surface of the first lens on the object side to the imaging surface is $\Sigma d$:

$0.5 < \Sigma d/f < 1.5$.

8. A digital camera imaging lens according to claim 5, wherein the following condition is satisfied when an Abbe number of the second lens is vd2:

$50 > vd2$.

* * * * *

UNITED STATES PATENT AND TRADEMARK OFFICE
CERTIFICATE OF CORRECTION

| | |
|---|---|
| PATENT NO. | : 7,400,454 B2 |
| APPLICATION NO. | : 11/788307 |
| DATED | : July 15, 2008 |
| INVENTOR(S) | : Yoji Kubota and Toshio Matsui |

Page 1 of 1

It is certified that error appears in the above-identified patent and that said Letters Patent is hereby corrected as shown below:

On the title page, items (22), (86), (87), (62) and (30) are missing. Please insert as follows:

(22) PCT Filed: Oct. 22, 2003

(86) PCT No.: PCT/JP03/13504

§371 (c) (1),
(2), (4) Date: Apr. 21, 2005

(87) PCT Pub. No.: WO2004/038478

PCT Pub. Date: May 6, 2004

Related U.S. Application Data

(62) Division of application No. 10/532,382, filed on Apr. 21, 2005, now Pat. No. 7,251,083.

(30) Foreign Application Priority Data

| | | | |
|---|---|---|---|
| Oct. 25, 2002 | (JP) | ......... | .2002-310376 |
| Dec. 26, 2002 | (JP) | ......... | .2002-376228 |
| Aug. 19, 2003 | (JP) | ......... | .2003-295296 |
| Aug. 19, 2003 | (JP) | ......... | .2003-295320 |

Signed and Sealed this

Twenty-third Day of September, 2008

JON W. DUDAS
*Director of the United States Patent and Trademark Office*